United States Patent
Ma et al.

(10) Patent No.: US 11,296,338 B2
(45) Date of Patent: Apr. 5, 2022

(54) DEVICE FOR STORING ELECTRICAL ENERGY OF SALT CAVERN FLOW BATTERY

(71) Applicants: Institute of Rock and Soil Mechanics, Chinese Academy of Sciences, Wuhan (CN); Chongqing University, Chongqing (CN)

(72) Inventors: Hongling Ma, Wuhan (CN); Chunhe Yang, Wuhan (CN); Yue Han, Chongqing (CN); Xilin Shi, Wuhan (CN); Xiaopeng Liang, Wuhan (CN); Kai Zhao, Wuhan (CN); Yuhao Zhang, Wuhan (CN); Yinping Li, Wuhan (CN); Tongtao Wang, Wuhan (CN); Hongwu Yin, Wuhan (CN)

(*) Notice: Subject to any disclaimer, the term of this patent is extended or adjusted under 35 U.S.C. 154(b) by 0 days.

(21) Appl. No.: 16/822,073

(22) Filed: Mar. 18, 2020

(65) Prior Publication Data
US 2021/0126269 A1  Apr. 29, 2021

(30) Foreign Application Priority Data
Oct. 29, 2019 (CN) .......................... 201911034036.0

(51) Int. Cl.
*H01M 8/00* (2016.01)
*H01M 8/04082* (2016.01)
(Continued)

(52) U.S. Cl.
CPC ... *H01M 8/04201* (2013.01); *H01M 8/04664* (2013.01); *H01M 8/188* (2013.01); *H01M 2250/10* (2013.01)

(58) Field of Classification Search
CPC ......... H01M 8/04201; H01M 8/04664; H01M 8/188; H01M 8/18; H01M 8/008;
(Continued)

(56) References Cited

U.S. PATENT DOCUMENTS 3,003,322 A * 10/1961 Jordan ...................... B65G 5/00
                                                    405/59
5,052,856 A * 10/1991 Tek .......................... B65G 5/00
                                                    405/59
(Continued)

FOREIGN PATENT DOCUMENTS

| CN | 101423142 A | * | 5/2009 |
| CN | 109378512 A | * | 2/2019 |
| CN | 110285936 A | * | 9/2019 |

OTHER PUBLICATIONS

Machine translation of CN-110285936 originally published to Han et al. on Sep. 27, 2019. (Year: 2019).*

(Continued)

*Primary Examiner* — Nicholas P D'Aniello

(57) ABSTRACT

Salt caverns with an inner container for storing electrical energy as a flow battery are provided. The salt caverns with an inner container for storing electrical energy as a flow battery comprises an air bag, a second pipeline and a first pipeline. The airbag is located in an underground salt cavern, the salt cavern is full of brine, and a liquid electrolyte is stored in the airbag. One end of the second pipeline is connected with the airbag while the other end thereof is located on the ground, and the second pipeline is used for filling the liquid electrolyte into the airbag. The first pipeline sleeves the second pipeline, one end of the first pipeline is connected with a shaft inlet of the salt cavern while the other end thereof is located on the ground, and the first pipeline is used for discharging the brine from the salt cavern.

17 Claims, 4 Drawing Sheets

(51) Int. Cl.
*H01M 8/04664* (2016.01)
*H01M 8/18* (2006.01)
(58) Field of Classification Search
CPC ........... H01M 8/2455; H01M 2250/10; H01M
8/04186; H01M 8/04276; H01M 8/04291;
B65D 88/76; B65D 90/00; E21B 453/00;
G01M 3/32; Y02E 60/50; Y02B 90/10
See application file for complete search history.

(56) References Cited

U.S. PATENT DOCUMENTS

| 2007/0220956 | A1* | 9/2007 | Terentiev | G01M 3/187 |
| | | | | 73/49.2 |
| 2019/0056287 | A1* | 2/2019 | Gao | B09B 1/004 |
| 2019/0229350 | A1* | 7/2019 | Neuhaus | H01M 8/188 |

OTHER PUBLICATIONS

Machine translation of CN-109378512 originally published to Wang et al. on Feb. 22, 2019. (Year: 2019).*

Machine translation of CN-101423142 originally published to Xianbiao et al. on May 6, 2009. (Year: 2009).*

* cited by examiner

DEVICE FOR STORING ELECTRICAL ENERGY OF SALT CAVERN FLOW BATTERY

RELATED APPLICATIONS

This application claims the benefit of priority from Chinese Application No. 201911034036.0 filed Oct. 29, 2019, the disclosure of which is incorporated herein by reference in its entirety.

TECHNICAL FIELD

The present invention relates to the technical field of new energy, and in particular, to a device for storing electrical energy of a salt cavern flow battery.

BACKGROUND

The existing salt cavern flow battery is to build a battery system in an underground salt cavern to store electrical energy in a liquid electrolyte. Specifically, brine and a recyclable polymer are utilized to form the liquid electrolyte and are stored in a huge underground salt cavern.

After a salt mine is exploited, hundreds of thousands of cubic meters of underground salt caverns are left. For example, The volume of each salt cavern is 100, 000 cubic meters (namely 3,500,000 cubic feet), so the total capacity of a battery can also be up to 700 MWh, and the output power is up to 120 MW, which can supply the electrical energy to about 75, 000 families one day. Therefore, the salt cavern has extremely high utilization value.

The salt cavern is full of saturated brine, comprising saturated NaCl, $K^+$, $Ca^{2+}$, $Mg^{2+}$, $SO_4^{2+}$, $CO_3^{2+}$, etc. These metal ions have a large influence on the liquid electrolyte of the flow battery. Furthermore, a heavy metal/sulfuric acid mixture is utilized by the liquid electrolyte of the flow battery to possibly pollute the underground water resource.

To overcome the problems, in the prior art, the liquid electrolyte is modified to fit the original condition of the salt cavern. Specifically, the recyclable polymer is utilized as active molecules of a brine electrolyte, which is more environmentally friendly in comparison with the heavy metal/sulfuric acid mixture utilized by the liquid electrolyte of the general redox flow battery. However, the salt cavern is full of saturated brine with very complex metal irons, which cannot be easily modified, and the concentration of ions in a salt mine of each region is different, thus, it is difficult to research and develop electrolytes fitting for the salt mines of all regions.

Therefore, how to simply and conveniently utilize the original liquid electrolyte to store the electrical energy is a problem urgent to be solved.

SUMMARY

To solve all or at least a part of the problems, the present invention provides a device for storing electrical energy of a salt cavern flow battery.

In one aspect, an embodiment of the present invention provides a device for storing electrical energy of a salt cavern flow battery, which comprises:

an airbag, wherein the airbag is located in an underground salt cavern, brine is stored in the salt cavern, and a liquid electrolyte is stored in the airbag;

a second pipeline, wherein one end of the second pipeline is connected with the airbag while the other end thereof is located on the ground, and the second pipeline is used for filling the liquid electrolyte into the airbag;

a first pipeline, wherein the first pipeline sleeves the second pipeline, one end of the first pipeline is connected with a shaft inlet of the salt cavern while the other end thereof is located on the ground, and the first pipeline is used for discharging the brine from the salt cavern.

Further, the airbag specifically is a bilayer airbag, including an inner membrane and an outer membrane.

Further, the electrical energy storage device of a salt cavern flow battery further comprises a leak detector.

The leak detector comprises multiple pairs of electrodes, a power supply and a warning light. The multiple pairs of electrodes are connected with the power supply through wires. The warning light is arranged on the wires. The multiple pairs of electrodes are arranged between the inner membrane and the outer membrane. The power supply and the warning light are arranged on the ground.

When the liquid electrolyte or the brine are leaked, it conducts more than one pair of electrodes such that the warning light is powered on.

Further, when the salt cavern has a regular shape, a distance between the airbag containing the liquid electrolyte and the salt cavern is in the range of 0.2-1 m.

Further, when the salt cavern has an irregular shape, a distance between the airbag containing the liquid electrolyte and the salt cavern is in the range of 1-2 m.

Further, the material of the airbag is any one of PVC and TPU.

Further, the density of the liquid electrolyte is equal to the density of the saturated brine.

Further, a first control valve is arranged on the first pipeline, and a second control valve is arranged on the second pipeline.

Further, the airbag specifically is a folding airbag.

One or more technical solutions of the embodiments of the present invention at least have the following technical effects or advantages:

The device for storing electrical energy of a salt cavern flow battery provided by the present invention comprises: the first pipeline connected with the shaft inlet of the salt cavern, the airbag and the second pipeline connected with an inlet of the airbag, wherein the first pipeline sleeves the second pipeline. The airbag is used for storing the liquid electrolyte. The brine is stored in the salt cavern. When the liquid electrolyte is filled into the airbag through the second pipeline, the brine is discharged from the salt cavern. The device for storing electrical energy of a salt cavern flow battery provided by the present invention is utilized to separate the liquid electrolyte from the brine in the salt cavern such that the underground water resource is not polluted, and the original liquid electrolyte is not changed. Therefore, energy consumption can be effectively reduced.

BRIEF DESCRIPTION OF THE DRAWINGS

Through reading the detailed descriptions of the following preferred embodiments, it will be obvious for those skilled in the art to understand all the other benefits and advantages. The drawings are only provided for the purpose of illustrating the preferred embodiments and should not be considered as any limitations on the present invention. Throughout the drawings, the same component will be indicated by the same reference number. In the drawings.

DESCRIPTION OF THE EMBODIMENTS

Exemplary embodiments of the present invention will be described below in more detail with reference to the accompanying drawings. Although the accompanying drawings show exemplary embodiments of the present invention, it should be understood that the present invention may be implemented in various forms and should not be limited to the embodiments set forth herein. On the contrary, these embodiments are provided so that the present invention will be more fully understandable, and will fully convey the scope of the present invention to those skilled in the art.

Figure 1:
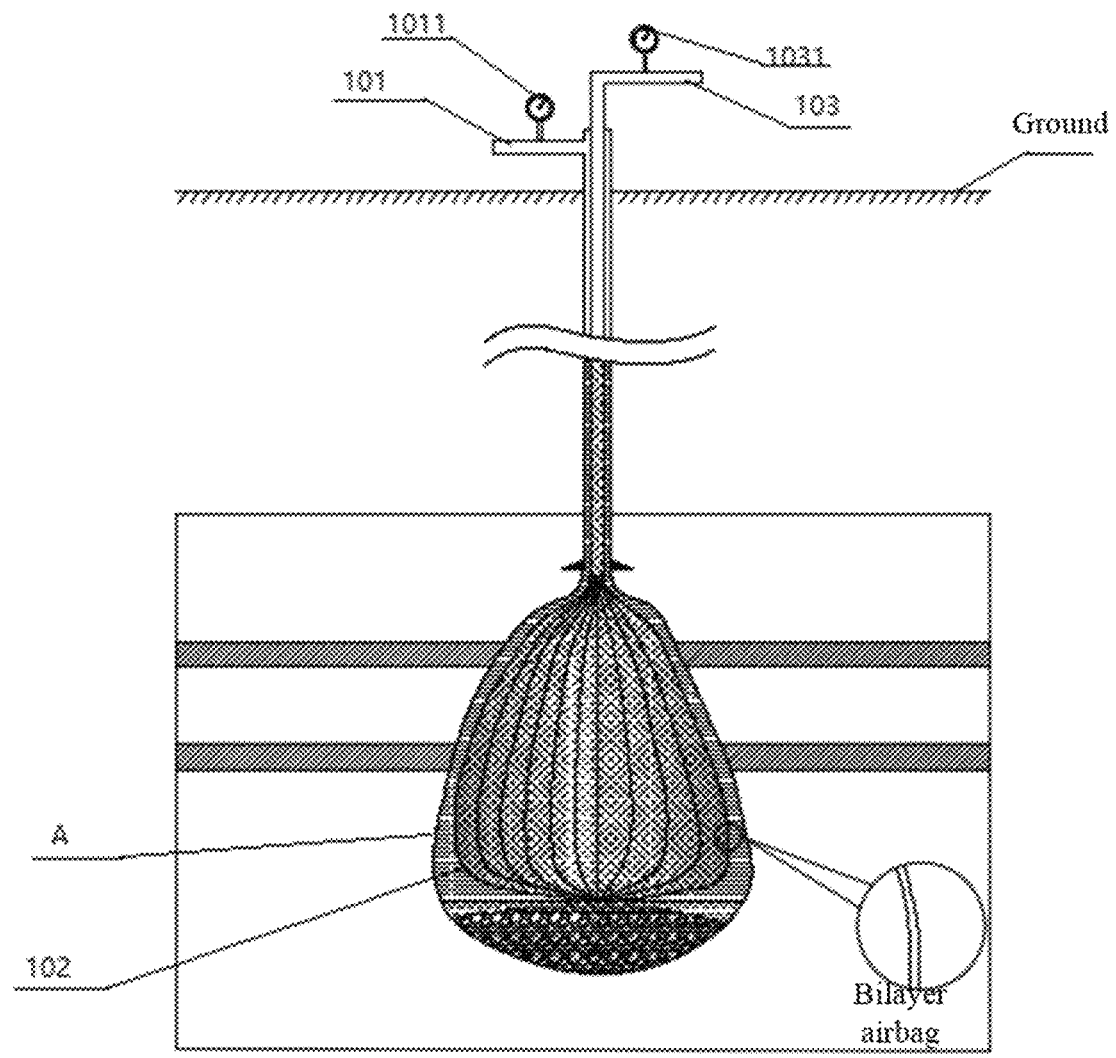
FIG. 1 is a schematic structural diagram of a device for storing electrical energy of a salt cavern flow battery in an embodiment of the present invention.

An embodiment of the present invention provides a device for storing electrical energy of a salt cavern flow battery. As shown in FIG. 1, the device for storing electrical energy of a salt cavern flow battery comprises an airbag 102, wherein the airbag 102 is located in an underground salt cavern A, salt cavern A is full with brine, and a liquid electrolyte is stored in the airbag 102;

a second pipeline 103, wherein one end of the second pipeline 103 is connected with the airbag 102 while the other end thereof is located on the ground, and the second pipeline 103 is used for filling the liquid electrolyte into the airbag 102;

a first pipeline 101, wherein the first pipeline 101 sleeves the second pipeline 103, one end of the first pipeline 101 is connected with a shaft inlet of the salt cavern A while the other end thereof is located on the ground, and the first pipeline 101 is used for discharging the brine from the salt cavern A.

In specific use, the liquid electrolyte is filled in the airbag 102 through the second pipeline 103; when the volume of the airbag 102 is gradually increased, the brine in the salt cavern A is discharged through the first pipeline 101. Therefore, the liquid electrolyte in the device for storing electrical energy of a salt cavern flow battery is separated from the brine in the salt cavern A and does not pollutes the underground water resource. Furthermore, the airbag itself 102 does not occupy too much volume of the salt cavern, so that an extremely large capacity of the liquid electrolyte can be provided to ensure the capacity of the stored electrical energy.

In a preferred embodiment, the airbag 102 specifically is a bilayer airbag, including an inner membrane and an outer membrane. The airbag 102 utilizes the bilayer airbag, so, when one membrane is broken and the liquid electrolyte or the saturated brine is leaked, the other membrane can work for a while to ensure the safety of the airbag.

The device further comprises a leak detector for detecting whether the airbag is broken to cause leakage of the liquid electrolyte or the brine. Specifically, the liquid electrolyte and the brine are conducting solutions. When the leak detector detects the liquid electrolyte or the brine, a circuit is switched on, and then a leakage signal is transmitted to the ground.

Figure 4:
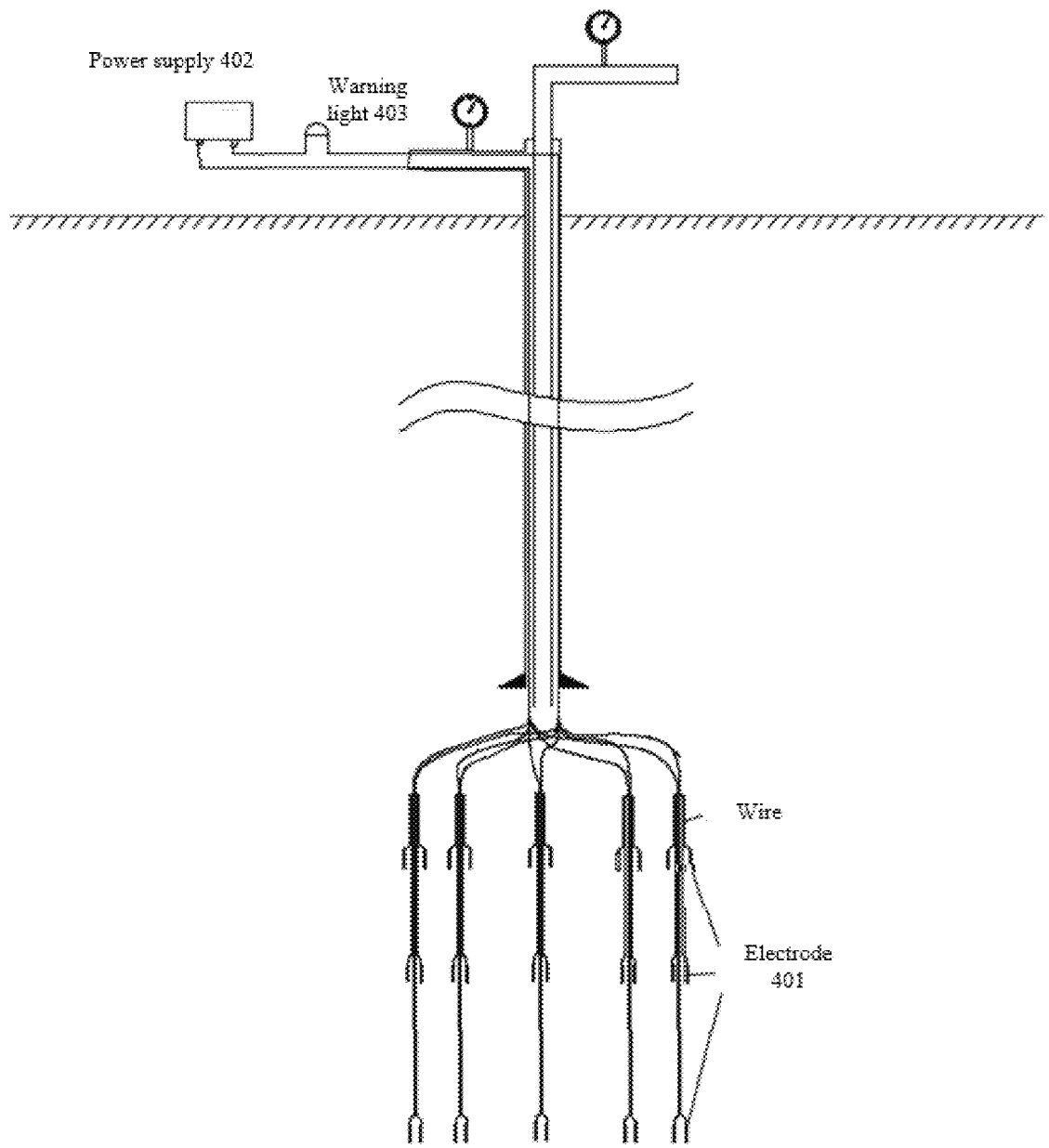
FIG. 4 is a schematic structural diagram of a leak detector in an embodiment of the present invention.

As shown in FIG. 4, the leak detector comprises multiple pairs of electrodes 401, a power supply 402 and a warning light 403. The multiple pairs of electrodes 401 are connected with the power supply 402 through wires. The warning light 403 is arranged on the wires. The multiple pairs of electrodes 401 are arranged between the inner membrane and the outer membrane. The power supply 402 and the warning light 403 are arranged on the ground.

When the liquid electrolyte or the brine are leaked, it conducts more than one pair of electrodes such that the warning light 402 is powered on.

The leak detector utilizes the multiple pairs of electrodes, which are arranged between the inner membrane and the outer membrane in a shape of tree branches and can extend to any positions between the inner membrane and the outer membrane. Specifically, at upper, middle and lower positions of the airbag, the electrodes are connected to the ground power supply through wires; thus, no matter which position is broken, the inner liquid electrolyte or the outer saturated brine is leaked, the electrodes are conducted such that the circuit is switched on and then the warning light is turned on. Therefore, if the warning light is on, it represents that leakage is on the way.

If the leak detector detects that the liquid electrolyte or the brine is leaked into a space between the inner membrane and the outer membrane of the bilayer airbag, the brine should be filled into the salt cavern through the first pipeline 101, thus under the pressure on an outer wall of the airbag 102, the liquid electrolyte in the airbag 102 is discharged through the second pipeline 103, at this time, the airbag 102 can be directly abandoned in the salt cavern A and does not need to be recycled. Furthermore, the airbag itself 102 nearly does not occupy the space after the inside liquid electrolyte is completely discharged. Therefore, the working efficiency is improved.

Because the shapes of salt caverns A are not always regular, a sonar survey should be conducted to manufacture airbags fitting for different shapes of the salt caverns A to ensure that the shape of an airbag full of the liquid electrolyte is roughly consistent with the shape of each salt cavern A and to fully utilize the space of the salt cavern.

Specifically, according to the sonar survey, a Scanner-2000 is conveyed downwards along the shaft by a cable of an integrated logging winch. A sonar probe enters the salt cavern through a sleeve to emit sound pulses to the boundary of the salt cavern on a certain horizontal section. A sonar receiving device detects a received return signal and transmits the signal to a ground data processing system through a cable connected with an underground instrument to obtain a horizontal section view of the cavity at a certain depth. The above same steps are conducted after changing the depth so as to obtain horizontal section views of the cavity at different depths. The top, bottom and irregular portions of the cavity of the salt cavern are detected by utilizing a tilt measurement function to obtain measurement distances at different tilt angles. Two kinds of original measurement data are processed and later explained by a computer, finally the volume, the depth, a three-dimensional image and various related parameters of the whole cavity are obtained.

The material of the airbag 102 specifically is any one of polyvinylchloride (PVC) and thermoplastic polyurethanes (TPU).

The PVC material can resist corrosion of gasoline, petroleum, and brine, abrasion, press and sunlight, and also has a certain bearing capacity.

The TPU material has the advantages of high strength, abrasion resistance, good elasticity, bending resistance, good airtightness and the like.

The salt cavern has a regular shape or an irregular shape.

When the salt cavern A has a regular shape, in view of creep of the salt cavern and to ensure that the airbag is not directly in contact with the salt cavern A, a distance between the airbag containing the liquid electrolyte and the salt cavern A is maintained in the range of 0.2-1 m.

Figure 2:
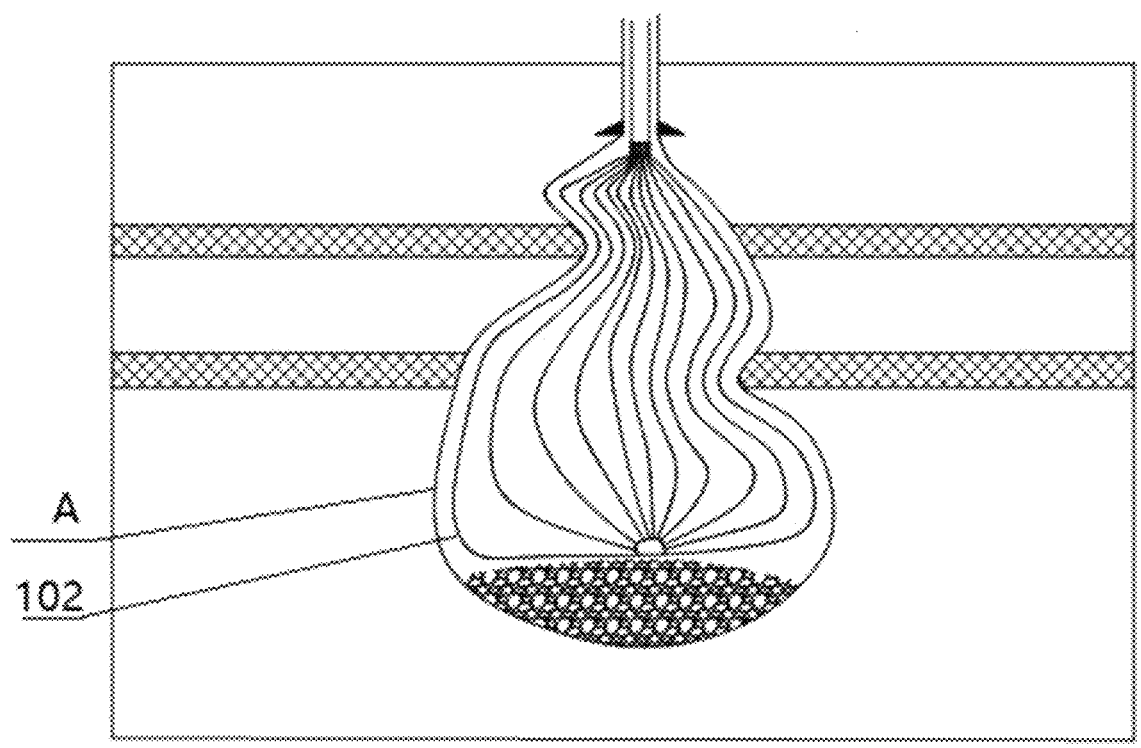
FIG. 2 is a schematic structural diagram of a relative airbag when a salt cavern has an irregular shape in an embodiment of the present invention.

When the salt cavern has an irregular shape, as shown in FIG. 2, a distance between the airbag 102 containing the liquid electrolyte and the salt cavern A is in the range of 1-2 m. Therefore, the airbag 102 is prevented from being directly in contact with the salt cavern A.

Figure 3:
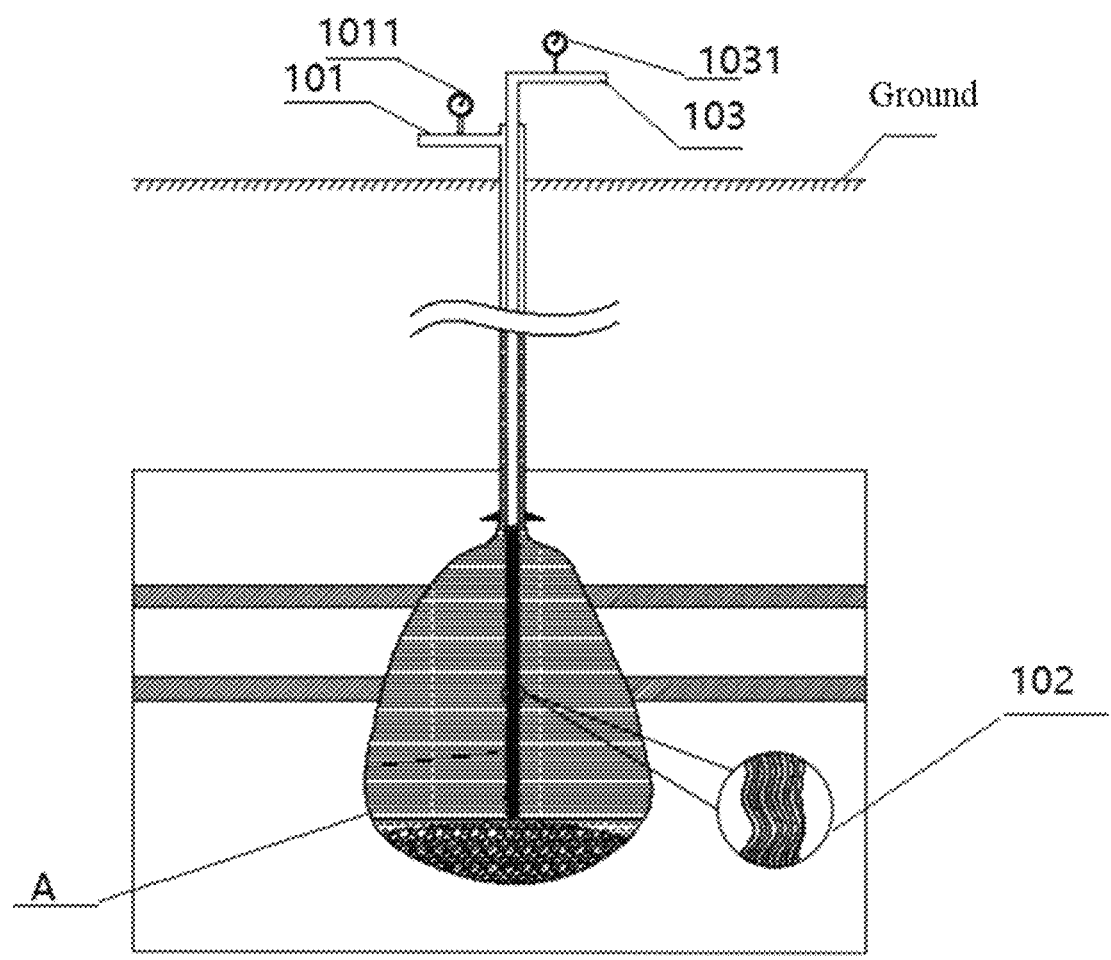
FIG. 3 is a schematic structural diagram when an airbag is placed in a salt cavern in an embodiment of the present invention.

Before the liquid electrolyte is filled into the airbag 102 through the second pipeline 103, the airbag 102 obtained according the sonar survey results needs to be placed in the salt cavern A. The airbag specifically is a folding airbag such that the folded airbag 102 can be conveniently placed into the salt cavern A through the first pipeline 101. As shown in FIG. 3, the airbag 102 firstly is folded into a small-size structure, such as a string, so as to be accommodated by the shaft of the salt cavern A. The second pipeline 103 is communicated with an inlet of the airbag 102 so it can transport the airbag 102 into the salt cavern A through the shaft of the salt cavern to complete placement of the airbag 102.

Next, the liquid electrolyte is filled into the airbag 102 through the second pipeline 103. When the volume of the airbag 102 is gradually increased, the brine in the salt cavern A is discharged through the first pipeline 101.

When the liquid electrolyte is filled into the airbag 102, the filling volume of the liquid electrolyte is recorded to ensure that the filling volume of the liquid electrolyte is not greater than the volume of the airbag 102 to prevent breakage of the airbag.

The density of the filled liquid electrolyte is different from the density of the brine. If the density of the liquid electrolyte is greater than the density of the brine, the full airbag may sink; if the density of the liquid electrolyte is less than the density of the brine, the full airbag may float; but the two situations are not fit for storage of the liquid electrolyte in the salt cavern. Therefore, the density of the brine should be adjusted to be close to the density of the liquid electrolyte such that the full airbag is not under unbalanced force to ensure the safety of the airbag full of the liquid electrolyte.

In a specific embodiment, the brine in the salt cavern is saturated brine.

Specifically, the density of the saturated brine is adjusted by adding an environmentally friendly substance to the saturated brine in order that the density of the saturated brine is close to the density of the liquid electrolyte. The density of the liquid electrolyte of an all vanadium flow battery is about 1.4 g/cm$^3$, which is slightly greater than 1.2 g/cm$^3$ of the density of the saturated brine, so the density of the liquid electrolyte is greater than the density of the saturated brine. The saturated brine of the underground salt mine contains calcium chloride. If the calcium chloride and the calcium bromide are compounded in a certain proportion, the density may be in the range of 1.40-1.80 g/cm$^3$. The calcium chloride, the calcium bromide and the zinc bromide are compounded in a certain proportion, the density may be in the range of 1.8-2.3 g/cm$^3$. The density of the saturated brine can be increased in the above any manner such that the density of the saturated brine is equal to the density of the liquid electrolyte.

In a specific embodiment, a first control valve 1011 is arranged on the first pipeline 101 and a second control valve 1031 is arranged on the second pipeline 103, thereby separating the salt cavern A from the outside environment and separate the liquid electrolyte in the airbag 102 from the outside. Certainly, filling and discharging of the liquid electrolyte and the brine are achieved by switching on the first control valve 1011 and the second control valve 1031.

One or more technical solutions of the embodiments of the present invention at least have the following technical effects or advantages:

The device for storing electrical energy of a salt cavern flow battery provided by the present invention comprises: the first pipeline connected with the shaft inlet of the salt cavern, the airbag and the second pipeline connected with an inlet of the airbag, wherein the first pipeline sleeves the second pipeline. When the liquid electrolyte is filled into the airbag through the second pipeline, the brine is discharged from the salt cavern. The device for storing electrical energy of a salt cavern flow battery provided by the present invention is utilized to separate the liquid electrolyte from the saturated brine in the salt cavern such that the underground water resource is not polluted, and the original liquid electrolyte is not need to modified. Therefore, energy consumption can be effectively reduced.

Although the preferred embodiments of the embodiments of the present invention have been described, persons skilled in the art can make additional changes and modifications to these embodiments once they learn the basic inventive concepts. Therefore, the appended claims are intended to be interpreted as including the preferred embodiments and all changes and modifications that fall within the scope of the present invention.

Obviously, persons skilled in the art can make various modifications and variations to the present invention without departing from the spirit and scope of the present invention. In this way, if these modifications and variations of the present invention belong to the scope of the claims of the present invention and its equivalent technology, the present invention is intended to include these modifications and variations.

What is claimed is:

1. A device for storing electrical energy of a salt cavern flow battery, comprising:
    an airbag, wherein the airbag is a bilayer airbag including an inner membrane and an outer membrane and located in an underground salt cavern, brine is stored in the salt cavern, and a liquid electrolyte is stored in the airbag;
    a second pipeline, wherein one end of the second pipeline is connected with the airbag while the other end thereof is located on the ground, and the second pipeline is used for filling the liquid electrolyte into the airbag;
    a first pipeline, wherein the first pipeline sleeves the second pipeline, one end of the first pipeline is connected with a shaft inlet of the salt cavern while the other end thereof is located on the ground, and the first pipeline is used for discharging the brine from the salt cavern;
    a leak detector, wherein the leak detector comprises multiple pairs of electrodes, a power supply and a warning light; the multiple pairs of electrodes arranged between the inner membrane and the outer membrane in a shape of tree branches are extendable to any positions between the inner membrane and the outer membrane and connected with the power supply through wires; the warning light is arranged on the wires; the power supply and the warning light are arranged on the ground;
    wherein the multiple pairs of electrodes are positioned around the inner membrane so as to detect leak in a surrounding environment, and when the liquid electrolyte or the brine are leaked, it conducts more than one pair of electrodes such that the warning light is powered on; and the density of the liquid electrolyte is equal to the density of the brine.

2. The device according to claim 1, wherein when the salt cavern has a regular shape, a distance between the airbag containing the liquid electrolyte and the salt cavern is in the range of 0.2-1 m.

3. The device according to claim 1, wherein when the salt cavern has an irregular shape, a distance between the airbag containing the liquid electrolyte and the salt cavern is in the range of 1-2 m.

4. The device according to claim 1, wherein the material of the airbag is any one of PVC and TPU.

5. The device according to claim 1, wherein a first control valve is arranged on the first pipeline, and a second control valve is arranged on the second pipeline.

6. The device according to claim 1, wherein a first control valve is arranged on the first pipeline, and a second control valve is arranged on the second pipeline.

7. The device according to claim 1, wherein a first control valve is arranged on the first pipeline, and a second control valve is arranged on the second pipeline.

8. The device according to claim 2, wherein a first control valve is arranged on the first pipeline, and a second control valve is arranged on the second pipeline.

9. The device according to claim 3, wherein a first control valve is arranged on the first pipeline, and a second control valve is arranged on the second pipeline.

10. The device according to claim 4, wherein a first control valve is arranged on the first pipeline, and a second control valve is arranged on the second pipeline.

11. The device according to claim 1, wherein a first control valve is arranged on the first pipeline, and a second control valve is arranged on the second pipeline.

12. The device according to claim 1, wherein the airbag is a folding airbag.

13. The device according to claim 1, wherein the airbag is a folding airbag.

14. The device according to claim 1, wherein the airbag is a folding airbag.

15. The device according to claim 2, wherein the airbag is a folding airbag.

16. The device according to claim 3, wherein the airbag is a folding airbag.

17. The device according to claim 4, wherein the airbag is a folding airbag.

* * * * *